April 14, 1964
J. J. KUPITS
3,129,194
RESINOUS MOLDING COMPOSITION
Filed March 27, 1957
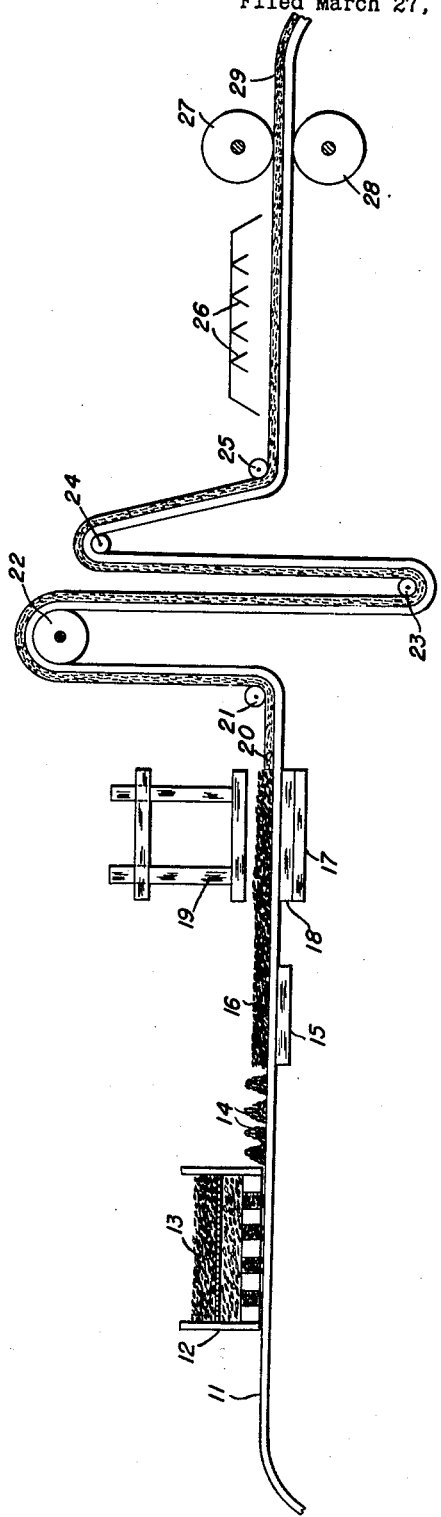
INVENTOR.
JOHN J. KUPITS
BY William T. Wise
AGENT

United States Patent Office 3,129,194
Patented Apr. 14, 1964

3,129,194
RESINOUS MOLDING COMPOSITION
John J. Kupits, Newtown, Pa., assignor to Congoleum-Nairn Inc., Kearny, N.J., a corporation of New York
Filed Mar. 27, 1957, Ser. No. 648,912
8 Claims. (Cl. 260—28.5)

This invention relates to flexible surface coverings which have a plastic decorative wear layer and particularly to a method of producing such coverings and an improved resinous composition useful in their production.

In accordance with present commercial practice, flexible plastic surface coverings having a wear layer containing a thermoplastic synthetic resinous binder, plasticizers, pigments and fillers are widely used as coverings for floors, walls, vehicle interiors and the like in the form of sheets or tiles. Vinyl resins such as polyvinyl chloride and its copolymers, particularly vinyl chloride copolymerized with vinyl acetate, are most commonly used in formulating synthetic resinous binders used in the production of such plastic surface coverings. When resins are blended with plasticizers, pigments, fillers and the like and sheeted, products with excellent wearing properties and resistance to attack by ordinary household chemicals are produced. These products have an unusual clarity and brilliance of color, and the relatively low cost of vinyl resins make them ideally suited for production of surface coverings having a large market.

The design and decoration of a surface covering is of prime importance in insuring acceptance of the product by the public. In recent years, there has been great interest in products resembling stone terrazzo. These products are characterized by having a random design comprising a plurality of adjacent small, irregular areas of contrasting color which impart excellent dirt-hiding qualities to the product. The conventional method of producing such products has been to use fused vinyl compositions. In preparing such vinyl compositions, the vinyl resins are commonly mixed with suitable plasticizers, pigments, fillers, stabilizers and the like and the resulting mixture kneeded or masticated at temperatures in the neighborhood of 350° F. Under these temperature conditions, the vinyl resin becomes fused, that is, uniformly solvated by the plasticizers. The fused vinyl composition is then sheeted and granulated. Granules of contrasting colors are then blended and deposited upon a web of backing material such as saturated felt. The covered web is passed under heating lamps to preheat the composition and then the mass is consolidated into a smooth unitary sheet in a press, such as a flat bed press. The upper platen of the press is usually maintained at a high temperature and the bottom platen unheated. Under these conditions of high temperature and pressure, the granules flow together and become bonded into a smooth uniform sheet. Only by the use of fused composition have pigmented and filled vinyl compositions of the type used in the surface covering industry attained sufficient strength to withstand the strains of sheeting, granulating and pressing without crumbling.

This prior art method has several serious operational disadvantages. Under the high temperature conditions necessary in the press, the composition tends to stick to the upper platen. Attempts to use lubricants in such composition have not been successful since these materials become absorbed in the mixing step and are not effective at the time of pressing. Although the sticking can be minimized by cooling the upper platen after the pressing cycle, it is apparent that the time and energy required to alternately heat and cool the large mass of metal represented by the platen is prohibitive in cost for a commercial product. As a result of the sticking problem, workers have been forced to apply press lubricants directly to the upper platen after every pressing cycle or to use a lubricated paper which passes between the platen and the granules. Such a method is disclosed, for example, in U.S. Patent 2,772,141, issued November 27, 1956. Although these methods are effective, they involve additional materials and labor and thus add to the cost of producing the product.

A further disadvantage of the method commonly used to produce a terrazzo effect in a vinyl plastic surface covering is the necessity of using special waterproofing saturants in the backing material. Due to the necessity of preheating the granules prior to the pressing step and the high temperatures used in the press, the felt backing used to support the granules can attain a high temperature. The use of thermoplastic resinous saturants is thus not desirable because under high temperature conditions the resins tend to soften and exude from the felt. Although various thermosetting saturants have been found effective and not subject to damage in the hot pressing cycle, their use leads to other processing difficulties. The saturation of felt with thermosetting saturants involves the heat treatment or stoving of the felt after saturation to bring about cure of the resin. This is a time-consuming process resulting in large inventories of felt in process, and, in addition, the heat release during cure of the resin poses a serious fire hazard in the presence of such a combustible material as felt. In addition, slow cure of the resin in the felt continues after a plastic wear layer has been pressed thereto, with the result that the product tends to stiffen with age losing its flexibility. Good flexibility in a surface covering product is important from the standpoint of ease of installation.

It is an object of the invention to produce a resinous composition which will readily release from a hot platen without sticking thereto. Another object of the invention is to produce a terrazzo effect without necessitating the application of lubricant to the surface of the press or without requiring the use of release papers. An additional object of the invention is to provide a plastic surface covering having a terrazzo effect which is characterized by smooth surface, high gloss, high abrasion resistance, good flexibility, and good cutting properties for easy installation. A further object of the invention is to produce a terrazzo effect in a vinyl composition smooth surface covering without subjecting the backing material to excessive temperatures. Other objects and the advantages of the invention will appear hereinafter.

In accordance with the invention, a resinous plastigel composition is provided which will readily release from a hot surface comprising synthetic resinous binder, plasticizer, filler and release additive wherein the major portion of the binder is unfused and unsolvated by the plasticizer and distributed as discrete unplasticized particles throughout the composition. This composition can be granulated, distributed on a backing and pressed into a sheet prior to fusing the major portion of the binder to produce a surface covering having the appearance of terrazzo.

The composition used in the manufacture of the granules which are consolidated to produce the terrazzo-appearing wear layer comprises a principal binder which is uniformly dispersed in the form of fine particles within a mixture of plasticizer, fused and solvated processing binder, pigments, fillers and stabilizers and contains as an essential ingredient a release additive. The principal binder is carried throughout the process in an unplasticized and unfused condition and is present as small discrete particles distributed throughout the remainder of the composition. The composition maintains sufficient strength and cohesiveness for processing into granules by the presence of a fused and solvated processing binder within the composition. After the consolidation of the granules on the backing sheet, the sheet is subjected to heat in order to fuse the principal binder. Thus, in the finished product the total binder content is made up of the principal binder which is fused after the pressing step and the processing binder which is fused during the initial mixing of the composition.

The physical characteristics typical of plastic surface coverings are attributable primarily to those properties contributed by the principal binder. As aforementioned, the resins most widely used as binders in this connection contain polyvinyl chloride. Copolymers of vinyl chloride and vinyl acetate which have specific viscosities above about 0.17 as measured in a solution containing 0.20 gram of resin per 100 milliliters of nitrobenzene at 20.0° C. and containing vinyl chloride in the range of about 90 percent to 97 percent by weight, as well as copolymers of vinyl chloride and dibutyl maleate, ethyl acrylate, methyl acrylate, butyl acrylate, methyl methacrylate, and butyl methacrylate, all containing substantially the same amount of combined vinyl chloride and having the same viscosity are particularly useful. In addition, copolymers of vinyl chloride and acrylonitrile containing 45 percent to 80 percent vinyl chloride can be used, as well as certain copolymers of vinyl chloride and vinylidene chloride. All of the vinyl resins mentioned hereinabove are substantially insoluble in toluene at 25° C. That is, when one part resin is shaken with ten parts toluene at 25° C., no more than 15 percent of the resin is extracted by and dissolved in the toluene.

Although vinyl resins as disclosed above are preferred, the principal binder can be any finely divided thermoplastic resin which requires high temperature fusion for film formation but which resists such fusion until the required temperature is attained. Vinyl resins normally must be heated to the neighborhood of 325° F. to 375° F. for fusion. It is essential that the resins selected for the principal binder used in preparing compositions in accordance with the invention do not undergo appreciable fusion or plasticization until the required temperature is attained. The preferred vinyl resins are the polymers and copolymers of vinyl chloride polymerized to a high degree as indicated by a specific viscosity of from about 0.17 to 0.31 determined by dissolving a 0.20 gram sample of resin in 100 milliliters of nitrobenzene at 20°±5° C.

It is preferred in selecting a principal binder for use in the invention that a dispersion grade resin be used. Such resins are available having particle sizes of from 0.02 to about 2 microns in contrast to calendar grade resins which are normally available as particles ranging from 5 to 35 microns. Dispersion grade resins are usually of higher molecular weight than calendar grade resins and have particle surfaces of hard, horny nature, thus making them difficult to plasticize at low temperatures. This is advantageous in that it is desired in producing products in accordance with the invention that the principal binder be carried through the process in an unfused state until after the final pressing step.

The principal binder and the processing binder together constitute the entire resinous binder for the finished product. The processing binder must be compatible with the principal binder since it becomes an integral part of the film which holds the ingredients of the finished sheet together. Therefore, the processing binder must be soluble in the plasticizer which ultimately plasticizes the principal binder. The processing binder must form a film when solvated by plasticizer and in addition, it must transform the free or available plasticizer employed in the composition from is normally liquid state to a state capable of holding together during processing.

It has been found that film formers such as thermoplastic or rubber-like elastomers meet the requirements set forth above and can be used in the invention as the processing binder. Such materials include low molecular weight polyvinyl chloride copolymerized with vinyl acetate such as a polymer having an intrinsic viscosity of about 0.79, butadiene derived elastomers such as butadiene-acrylonitrile and butadiene-styrene copolymers, polyisobutylene-isoprene, polymerized chloroprene, polymerized esters of rosin having film forming ability and capability with vinyl resins such as Neolyns, manufactured by Hercules Powder Co., and the like. These resins are high melting point rubber-like resins having a high viscosity (above 40 by Mooney) which will maintain a high viscosity in the presence of the total plasticizer required and are capable of forming a flexible film at temperatures below the point where the principal binder becomes plasticized and fused. A processing binder which will fulfill all the requirements of the invention will substantially increase the tensile strength of the composition before plasticization of the principal binder and will not substantially decrease the tensile strength of the composition after fusion as compared to a similar composition minus such processing binder. Best results have been obtained with a high molecular weight copolymer of butadiene and acrylonitrile and similar rubbery polymers from the standpoint of ease of handling a composition prepared therewith and in regard to final product characteristics.

Plasticizers such as are conventionally employed in the plastic surface covering art can be used in the invention. There must be sufficient plasticizer to ultimately plasticize the principal binder and processing binder but the interaction between plasticizer and principal binder must be delayed until the final fusion step.

The plasticizer must have a low vapor pressure at the high temperatures required to fuse the principal binder. It has been found that a vapor pressure at 400° F. below about 2 millimeters of mercury gives very satisfactory results. Aliphatic ester plasticizers, therefore, such as dimethyl phthalate, dibutyl phthalates, dicapryl phthalate, dioctyl phthalate, dibutyl sebacate, dioctyl sebacate, dibutoxy ethyl phthalate, dibutoxyglycol phthalate, trioctyl phosphate, octyl-decyl adipate, triethylene glycol di-2-ethylbutyrate and the like and combinations thereof have been used successfully. Low molecular weight polymeric materials such as adipic or sebacic acid polyesters and the like can also be used.

Secondary plasticizers, which are less compatible with the principal binder, can be used in combination with the primary or solvent type plasticizers described above. The quantity of secondary plasticizer used is limited by its degree of compatibility with the principal binder and the primary plasticizer used. Examples of suitable secondary plasticizers are alkyd derivatives of rosin, phenoxyethyl oleates and laurates, chlorinated paraffine, aromatic hydrocarbon condensates and the like. Mixtures of primary and secondary plasticizers have relatively low solvating rates on the principal binder at temperatures below 200° F. The rate of solvation of the principal binder at the fusion temperature is not appreciably retarded.

These three classes of ingredients, namely, principal binder, processing binder and plasticizer, make up what is characterized as the plasticized binder of the composition. It should be emphasized that both principal binder and processing binder can either be individual resins or mixtures of resins. The plasticizer will normally be made up of a mixture of plasticizers as disclosed above. In accordance with the invention, the total plasticized binder content ranges from about 20 percent to about 75 percent of the composition. A range of from 40 percent to 70 percent of the composition is particularly effective. Of the plasticized binder, the plasticizer or mixture of plasticizers can comprise from about 15 percent to about 50 percent by weight, and it is preferable to use from 20 percent to 35 percent. Thus, in the plasticized binder the resinous binder will comprise from about 85 percent to about 50 percent by weight and preferably from 80 percent to 65 percent. Of the total binder, the processing binder is the minor constituent. Generally, if more than 30 percent of the total binder is processing binder, the final product has inferior tensile strength and flexibility. Therefore, it is desirable to use as little processing binder as needed to produce a composition which can be satisfactorily formulated into granules. Amounts as low as 2 percent processing binder in the total binder can be used. The best results have been obtained when the resinous binder of the composition is made up of from 5 percent to 20 percent processing binder and from 95 percent to 80 percent principal binder.

Compositions useful in preparing surface coverings in accordance with the invention are characterized by having relatively large amounts of filler. Filler includes inert materials such as limestone, clay, whiting, pumice, talc, asbestos, wood flour and the like which are normally added as very small particles, that is, 80 mesh and finer, and pigments such as titanium dioxide, zinc oxide, and various colored pigments are added to produce compositions having the desired colors. The composition will normally contain from about 25 percent to about 80 percent filler with the range 30 percent to 60 percent being particularly effective.

Minor amounts of stabilizers which are incorporated to reduce the effects of degradation by light and heat are also present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like.

The composition also preferably includes heat stabilizers such as sulfides and sulfites of aluminum, silver, calcium, cadmium, magnesium, cerium, sodium, strontium and the like, glycerine, leucine, alanine, o- and p-amino benzoic and sulfonilic acids, hexamethylene tetramine, weak acid radicals including oleates, ricinoleates, abietates, salicylates and the like.

It is essential in carrying out the method of producing surface coverings in accordance with the invention that the composition used in making the granules contain a small amount of a release additive. Release additives in accordance with the invention are waxy substances which must be fluid at the temperature of the press platen without substantial vaporization. Waxy substances which have a softening point of below 330° F. are satisfactory when compositions comprising the preferred resinous binders are utilized in accordance with the invention.

Suitable waxy substances for use in accordance with the invention can include those materials of both synthetic and natural origin which are conventionally referred to as waxes. Such naturally occurring waxes as vegetable waxes, including carnauba wax, cotton seed wax, montan wax, candelilla wax, flax wax, seaweed wax and the like; insect and animal waxes, such as beeswax, Chinese insect wax, spermaceti and the like; and petroleum waxes such as paraffin wax, are effective. Various synthetic waxes can also be used as the release additive in the invention. Waxes prepared by the polymerization of olefins such as ethylene, propylene, butylene and the like in the presence of catalysts such as silica, silica-alumina, molybdena and phosphoric acid are suitable. In addition, various high molecular weight polyethylene and polypropylene glycols are useful waxes.

Fatty acids having from 12 to 30 carbon atoms and their derivatives are also waxy substances which can be used in the invention. Such acids as lauric, myristic, palmitic, stearic, behenic and the like, as well as their derivatives such as heavy metal salts, esters, amides and the like, are useful. Salts or soaps of heavy metals such as calcium, magnesium, barium, aluminum, zinc, lead, copper, cobalt and nickel with fatty acids of from 12 to 30 carbon atoms have waxy properties rendering them good release additives for use in the invention. In addition, esters of long chain fatty acids having from 12 to 30 carbon atoms with alcohols having from 6 to 30 carbon atoms are also useful. The esters can be based on such long chain fatty acids as tabulated above and such alcohols as hexyl alcohol, octyl alcohol, isooctyl alcohol, cetyl alcohol, arachyl alcohol, ceryl alcohol and the like. Thus effective esters can include isooctyl palmitate, cetyl myristate, duodecyl stearate, octyl cerotinate, cetyl palmitate, hexyl carnubate and the like. The higher molecular weight esters have similar physical properties to waxes, and in many cases the major ingredient in a natural occurring wax is a high molecular weight ester as disclosed above.

The release additive is present in the composition in an amount sufficient to give good release of the composition from a hot platen and is usually about 0.2 to 2.5 percent. Amounts between 0.5 and 1.5 percent are particularly effective. Natural waxes such as carnauba wax have been found to be particularly effective release additives.

In the preparation of granules for use in the production of surface coverings in accordance with the invention, a portion of the plasticizers, processing binder, pigments, fillers, stabilizers and release additive are blended in the conventional manner used in blending thermoplastic resinous compositions. It is not necessary to exercise any severe limitations with respect to this mixing operation, which can be conducted at temperatures as high as 300° F. During this mixing the processing binder becomes fused and solvated by the plasticizers. Using the preferred butadiene derived elastomers, the temperature of this initial mixing normally is about 200° F. to 250° F.

The principal binder and addition agents are then added to the mass of plasticizers, fused processing binder, pigments, fillers, stabilizers and release additive. This addition must be conducted so as not to increase the temperature of the mixture above about 120° F. This is necessary in order that no fusion or solvation of the principal resin and no absorption of the release agent will occur. This mixing step is commonly carried out in a Pfleiderer or Baker-Perkins type mixer and ribbons of composition are removed which are then reduced to small particles by a suitable comminuting device. Again the temperature of the composition is maintained at less than about 120° F. by water cooling or other means.

If plain colored granules are desired, the particles can be sheeted in a two-roll calender. However, if a jaspe or streaked effect is desired, particles of different colors are calendered together. The resulting sheet can be broken up into granules or the jaspe sheet cut, turned 90° and resheeted to produce a marbleized appearance if this is desired. In place of calendering, a sheet can be formed by pressing in a flat bed or rotary press. In any event, during the sheeting and granule production, the temperature of the composition must be carefully controlled to avoid any overheating, which might cause premature fusion of the principal binder. Should this occur, the composition would become stiff and difficult to handle and the effect of the release additive would be nullified.

In preparing a surface covering having a terrazzo appearance in accordance with the invention, as many separate batches of composition are prepared, sheeted and granulated as there are colors in the finished product. The separate batches of granules are then blended in the proper proportions to give the desired blend.

One method of producing a plastic surface covering in accordance with the invention is illustrated by the accompanying drawing wherein the figure shows a schematic representation of the production of a terrazzo decoration in a plastic floor covering in accordance with the invention.

A backing sheet 11 passes, in stepwise fashion, beneath a granule strickler unit 12 by means of which granules 13 prepared as described above are deposited in piles 14 upon the backing sheet. The piles are leveled and a uniform layer of granules 16 attained by passage of the sheet over a vibrating plate 15. The sheet passes to a flat bed press which is made up of a lower press plate 17 bearing a resilient layer 18 upon which the backing sheet rests and an upper platen 19 which is capable of being heated by steam or other heating means. In the press, the granules are consolidated into a smooth layer 20 and bonded to the backing sheet. The consolidated sheet then passes over rolls 21, 22, 23, 24, 25 which serve to translate the intermittent sheet motion as a result of the pressing to a continuous motion through subsequent equipment. The roll 23 is vertically movable and serves to take up slack in the system. The sheet continuously passes under heating elements 26 which heat the smooth composition layer to fusion temperature and then through a planishing unit made up of an upper polished chrome roll 27 and a lower resilient surfaced roll 28. The smooth polished product 29 passes from the planishing unit to storage.

The backing sheet on which the granules of plastic composition prepared as described above are pressed can be a sheet which is subsequently stripped from the formed plastic sheet, or it can become an integral part of the final product. The conventional procedure is to use a fibrous backing sheet which becomes part of the product. Numerous fibrous materials can be used in preparing a fibrous backing sheet for use in the invention. The fibrous material used is normally cellulose in origin although other fibers can be used, including those of animal and mineral origin. The sources of cellulose can include cotton or other rag stock, wood pulp, including both ground wood and chemical wood pulp, paper, boxes or mixtures thereof in any proportions. In addition, fillers such as wood flour can be used. An aqueous slurry of fibers is sheeted on a Fourdrinier or cylinder paper machine and the sheet dried.

In order that the fibrous sheet have sufficient strength for use as a surface covering material, it is conventionally impregnated with suitable saturants. The conventional asphalt saturants used in preparing backing sheets in the manufacture of linoleum and other smooth surface floor coverings are not satisfactory. The high temperatures encountered in the pressing step and subsequent fusion cause conventional asphalt saturants to exude from the sheet resulting in damage to the press. Fibrous sheets impregnated with thermoplastic or elastomeric resins are particularly effective in the invention. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Polymers and copolymers of vinyl acetate are particularly effective. Fibrous sheets impregnated with these resins impart good strength and flexibility to the final product and permit processing at elevated temperatures without exudation.

Such thermoplastic and elastomeric resins can be incorporated most conveniently into a fibrous sheet by adding an emulsion of the resin to the suspension of fibers in water prior to sheet formation. The resin is then precipitated by the addition of well-known precipitating agents, such as alum. In this way the resin forms agglomerates upon the fibers serving to partially bond them together.

A sheet with improved cutting properties and water resistance can be produced by passing the fibrous sheet formed as described through a bath of thermoplastic resinous material which has a softening point of between about 100° F. and 160° F., thereby impregnating the sheet. Resins derived from petroleum are particularly effective for this purpose. Particularly effective fibrous sheets so prepared will contain from about 3 to about 15 percent of the thermoplastic or elastomeric resin added prior to sheet formation and from about 10 to about 45 percent thermoplastic resin added by impregnation. Such a felt imparts excellent cutting properties, flexibility and strength to the finished product.

In order that the decorative composition will adhere satisfactorily to the fibrous backing sheet after being pressed thereon, the sheet is normally coated with an adhesive prior to the deposit of granules. The presence of an adhesive coating aids also in keeping granules on the sheet during the deposition of granules. Adhesives in the form of emulsions in water are particularly effective, as for example, an emulsion of butadiene-acrylonitrile rubber and hard pine resin, such as that sold by Hercules Powder Company under the trademark "Vinsol." The emulsion is applied to the surface of the backing sheet to which the composition is to be bonded and then the sheet is heated to evaporate the water in the emulsion. Methods for preparing such sheet are disclosed in U.S. Patent 2,757,711 which issued on August 7, 1956, to R. K. Petry et al. Although adhesives available in the form of emulsions are preferred, solvent-based adhesives can also be used. In some cases when a felt backing is impregnated with a resin which is compatible with the composition used for preparing the granules, no adhesive is required.

The adhesive coated felt is passed under suitable means for depositing a uniform pattern of granules. Conventional strickler plates are commonly used. These have a plurality of spaced holes which are filled with granules when the plate is pressed tightly against the upper surface of the fibrous sheet. When the plate and sheet are separated, the granules are deposited on the sheet in the form of spaced piles. In order to smooth out the piles into an even layer, it is conventional that the sheet pass over a vibrating plate, as a result of which a smooth layer of granules is uniformly distributed over the entire surface of the backing sheet.

The granule covered sheet passes to a conventional press. The fibrous backing sheet rests on a rubber or other resilient pad, which is on top of the bottom press plate. The upper platen at a temperature of between 270° F. and 330° F. is pressed onto the composition. The pressure is rapidly increased, reaching a maximum value in the range of 700 to 1200 pounds per square inch which is held for a period of up to about 15 seconds. The pressure is then removed and the press plates separated.

By utilizing the composition of the invention in manufacturing granules, the hot platen of the press can be stripped from the consolidated sheet without the composition sticking to the plate. It is important that the hot platen be maintained at a high enough temperature to effect flow and consolidation of the plastic composition but not sufficiently hot to effect complete fusion and solvation of the principal binder. If fusion should occur in the press, the release additive becomes absorbed in the composition and satisfactory release does not take place. The upper platen must be maintained below the fusion temperature of the composition. Theoretically, the temperature of the platen can approach the fusion temperature within a fraction of a degree. However, for best mechanical and process control in commercial operation, it is preferred that the platen temperature be at least 20° F. below the fusion temperature of the composition. Thus, with the preferred formulations, the hot platen should not exceed 330° F. and will normally be maintained between 270° F. and 330° F.

After the pressing operation, the sheet passes continuously through a fusing oven. The change from intermittent sheet operation during pressing and continuous operation during fusing is taken care of by conventional festooning systems or other types of intermediate storage. For example, the pressed sheet can be rolled up and then unrolled at a later time for fusion. However, to effect economy of energy utilization, it is desirable to pass the hot sheet directly from the press to the fusion oven. In the fusion oven the temperature of the composition must reach the fusion temperature at which the principal binder becomes solvated by the plasticizers. Using the preferred vinyl resins as principal binder, the fusion temperature is about 350° F. The heating can be brought about by means of forced hot air but the use of radiant heating lamps or other heating elements have been found particularly desirable. Use of radiant heat permits rapid heating of the composition and minimizes heating the felt backing to excessive temperatures.

After fusion of the sheet, it is passed through a planishing unit. This consists of an upper heated polished chrome roll held at about 200° F. to 220° F. which engages the plastic composition layer and a lower resilient surface roll which engages the backing sheet. In the planishing step a highly desirable polish and smoothness is imparted to the product. The planished sheet leaves the planishing unit and passes to storage. Products produced in accordance with the invention can be used either in the form of sheets, as for example, sheets of 6 foot width, or can be cut into tiles in the manner well known in the surface covering industry.

The following example is given for purposes of illustration.

*Example 1*

The following blend was prepared in a Banbury mixer:

| | Parts by weight |
|---|---|
| Copolymer of 65% butadiene, 35% acrylonitrile, Mooney viscosity 75 | 3.4 |
| Adipic acid polyester plasticizer | 4.8 |
| Stabilizers | 1.1 |
| Carnauba wax release additive | 0.8 |
| Whiting | 54.0 |
| Pigment | 1.3 |
| Total | 65.4 |

No heat was added during the mixing operation but due to energy introduced into the batch a temperature of 225° F. was attained at the end of 10 minutes of mixing. Under these conditions the butadiene-acrylonitrile copolymer (processing binder) was solvated by the plasticizer.

The mixture was dumped into pans and allowed to cool to room temperature. The cooled mass was then blended in a Baker-Perkins mixer with resin and plasticizers in the following proportions:

| | Parts by weight |
|---|---|
| Banbury batch | 65.4 |
| Copolymer of 97% vinyl chloride, 3% vinyl acetate, specific viscosity [1] 0.2 | 29.1 |
| Dioctyl phthalate | 4.3 |
| Adipic acid polyester plasticizer | 1.2 |
| Total | 100.0 |

[1] Specific viscosity measured in a solution of 0.2 gram resin in 100 cc. nitrobenzene at 20° C.

In the mixing operation, the resin in the form of fine particles was added slowly and the speed of mixing and rate of addition was controlled so that the temperature did not exceed 120° F. This blend contained 42.8 percent plasticized binder, 55.3 percent filler, 0.8 percent release additive and 1.1 percent stabilizer. The plasticized binder contained 76 percent resinous binder and 24 percent plasticizer, with the binder being 10 percent processing binder and 90 percent principal binder.

This blend of unfused principal binder, fused processing binder plasticizer, filler, stabilizer and release additive was calendered between cooled rolls to produce a sheet with a thickness of 0.015 inch. The resulting sheet was granulated into irregular pieces ranging from very small size up to a maximum of about ½ inch in the largest dimension.

Granules prepared as described above were blended with similar granules of contrasting colors to produce a granular mix having the relative colors desired in the finished product. The granules were strickled in the form of spaced piles onto a sheet of impregnated felt bearing a dried adhesive coating comprising 60 parts copolymer of butadiene-acrylonitrile and 40 parts hard pine resin. The felt was impregnated with a mixture of polyvinyl acetate and a petroleum resin (softening point 125° F.).

The sheet was passed over a vibrating plate by means of which the piles of granules were leveled forming a uniform layer. The sheet then passed intermittently through a flat bed press with the felt resting on a resilient rubber pad and the top platen being maintained at a temperature of 315° F. Pressure was built up rapidly to 1,000 pounds per square inch and maintained at this point for 8 seconds. In the press, the composition became softened and flowed together to form a smooth unitary sheet having a wear layer thickness of 0.030 inch.

The hot platen was raised from the pressed composition layer which readily released therefrom. The sheet then passed continuously beneath a bank of infrared lamps with the speed of sheet movement and number of lamps adjusted so that all the composition attained a temperature of 350° F., thereby fusing and solvating the vinyl chloride-vinyl acetate copolymer which was the principal binder in the composition. Immediately after the fusing operation the sheet passed through a planishing unit made up of an upper polished chrome roll which contacted the composition and a bottom rubber surfaced roll over which the felt backing passed. The chrome roll was heated to a temperature of 210° F. and imparted a high polish and smoothness to the product. The planished sheet was then permitted to cool and then was rolled up ready for sale and installation.

Products produced in accordance with the invention are characterized by having a high polish and smoothness of the wearing surface and have good flexibility, with resulting ease of handling during installation. By control of the size of granules and the relative percentages of coarse and fine granules in the mix, a wide range of decorative effects can be obtained. Through the presence of a release additive in the composition being pressed, costly release papers are not required to prevent the composition layer from sticking to the hot platen. Due to ready release of composition from the hot platen, high production rates can be realized since there is no necessity to cool the upper press plate before the press sheet is removed therefrom.

The invention has been described with reference to use of the novel composition for preparation of a plastic surface covering having a terrazzo decoration with sheet formation in a flat bed press. Since the composition has the ability to release readily from a hot surface maintained at below fusion temperature of the composition, other methods of sheet formation, such as rotary press or calendering can be used advantageously.

Any departure from the above description which conforms with the present invention is intended to be included within the scope of the claims.

I claim:

1. A resinous molding composition in the form of a plastigel having a fusion temperature of between about 325° F. and about 375° F. and characterized by a high tensile strength and the ability to be readily stripped after pressing from a hot platen maintained at a temperature below said fusion temperature and between about 270° F. and about 330° F. which comprises 30 percent to 60 percent of filler, 0.5 percent to 1.5 percent of a waxy substance having a softening point temperature below the temperature of said platen and the remainder a thermoplastic synthetic resinous binder and plasticizer therefor, 5 percent to 20 percent of said resinous binder being a rubbery copolymer of butadiene and acrylonitrile having a viscosity above 40 Mooney as a continuous film plasticized by said plasticizer thereby holding the composition in a unitary mass and the remainder of said binder being uniformly dispersed throughout the composition in the form of discrete unplasticized and unfused particles of vinyl resin having a particle size of from 0.02 to 2 microns and a specific viscosity between 0.17 and 0.31, said vinyl resin being a polymer of vinyl chloride containing at least 90 percent by weight polymerized vinyl chloride, said plasticizer comprising from 20 percent to 35 percent of the amount of said resinous binder plus plasticizer.

2. A solid resinous molding composition in the form of a plastigel comprising a mixture of a minor amount of plasticized and fused resin and a major amount of and unplasticized unfused resin dispersed in the form of fine particles throughout said fused resin and capable of being converted to a hard elastic mass by heating to the fusion temperature of the major amount of resin and prior to fusion characterized by its high tensile strength and its ability to be readily stripped after pressing from a hot platen maintained at a temperature below said fusion temperature, which comprises an intimate mixture of about 25% to about 80% of filler, about 0.2% to about 2.5% of a waxy substance having a softening point below the temperature of said platen and the remainder binder, about 2% to about 30% of said binder being a fused thermoplastic elastomer resin plasticized and plasticizer which holds said composition in a cohesive mass, and about 70% to about 98% of said binder being a vinyl resin in the form of discrete unplasticized with plasticizer and unfused particles uniformly dispersed throughout the fused composition and plasticizer for said dispersed binder.

3. A solid resinous molding composition in the form of a plastigel comprising a mixture of a minor amount of plasticized and fused resin and a major amount of and unplasticized unfused resin dispersed in the form of fine particles throughout said fused resin and capable of being converted to a hard elastic mass by heating to the fusion temperature of the major amount of resin and prior to fusion characterized by its high tensile strength and its ability to be readily stripped after pressing from a hot platen maintained at a temperature below said fusion temperature, which comprises an intimate mixture of about 25% to about 80% of filler, about 0.2% to about 2.5% of a waxy substance having a softening point below the temperature of said platen and the remainder binder, about 2% to about 30% of said binder being a fused thermoplastic elastomeric resin plasticized and plasticizer having a viscosity above 40 by Mooney which holds said composition in a cohesive mass, and about 70% to about 98% of said binder being a vinyl resin having a specific viscosity of about 0.17 to about 0.31 in the form of discrete unplasticized with plasticizer and unfused particles uniformly dispersed throughout the fused compositon and plasticizer for said dispersed binder.

4. A solid resinous molding composition in the form of a plastigel comprising a mixture of a minor amount of plasticized and fused resin and a major amount of and unplasticized unfused resin dispersed in the form of fine particles throughout said fused resin and capable of being converted to a hard elastic mass by heating to the fusion temperature of the major amount of resin and prior to fusion characterized by its high tensile strength and its ability to be readily stripped after pressing from a hot platen maintained at a temperature below said fusion temperature, which comrpises an intimate mixture of about 25% to about 80% of filler, about 0.2% to about 2.5% of a waxy substance having a softening point below the temperature of said platen and the remainder binder, about 2% to about 30% of said binder being a fused thermoplastic butadiene elastomer having a viscosity above 40 by Mooney which holds said composition in a cohesive mass, and about 70% to about 98% of said binder being a vinyl chloride resin having a specific viscosity of about 0.17 to about 0.31 in the form of discrete unplasticized with plasticizer and unfused particles uniformly dispersed throughout the fused composition and plasticizer for said dispersed binder.

5. A solid resinous molding composition in the form of a plastigel comprising a mixture of a minor amount of plasticized and fused resin and a major amount of unfused and unplasticized resin dispersed in the form of fine particles throughout said fused resin and capable of being converted to a hard elastic mass by heating to the fusion temperature of the major amount of resin and prior to fusion characterized by its high tensile strength and its ability to be readily stripped after pressing from a hot platen maintained at a temperature below said fusion temperature, which comprises an intimate mixture of about 25% to about 80% of filler, about 0.2% to about 2.5% of a waxy substance having a softening point below the temperature of said platen and the remainder binder, about 2% to about 30% of said binder being a fused thermoplastic elastomer selected from the group consisting of copolymers of vinyl chloride and vinyl acetate, butadiene and acrylonitrile, butadiene and styrene, isobutylene and isoprene, and polymerized ester of rosin having a viscosity above 40 by Mooney which holds said composition in a cohesive mass, and about 70% to about 98% of said binder being a vinyl resin selected from the group consisting of polymers and copolymers of vinyl chloride having a specific viscosity of about 0.17 to about 0.31 in the form of discrete unplasticized with plasticizer and unfused particles uniformly dispersed throughout the fused composition and plasticizer for said dispersed binder.

6. A solid resinous molding composition in the form of a plastigel comprising a mixture of a minor amount of plasticized and fused resin and a major amount of and unplasticized unfused resin dispersed in the form of fine particles throughout said fused resin having a fusion temperature of between about 325° F. and about 375° F., and capable of being converted to a hard elastic mass by heating to its fusion temperature and prior to fusion characterized by its high tensile strength and its ability to be readily stripped after pressing from a platen maintained at a temperature below said fusion temperature between about 270° F. and about 330° F., which comprises an intimate mixture of about 25% to about 80% of filler, about 0.2% to about 2.5% of a waxy substance having a softening point below the temperature of said platen, and the remainder binder, about 2% to about 30% of said binder being a fused thermoplastic elastomeric resin plasticized and plasticizer having a viscosity above 40 by Mooney, and about 70% to about 98% of said binder being a vinyl resin having a specific viscosity of about 0.17 to about 0.31 in the form of discrete unplasticized with plasticizer and unfused particles uniformly dispersed throughout the fused composition and plasticizer for said dispersed resin.

7. A solid resinous molding composition in the form of a plastigel comprising a mixture of a minor amount of plasticized and fused resin and a major amount of and unplasticized unfused resin dispersed in the form of fine particles throughout said fused resin having a fusion temperature of between about 325° F. and about 375° F., and capable of being converted to a hard elastic mass by heating to its fusion temperature and prior to fusion characterized by its high tensile strength and its ability to be readily stripped after pressing from a platen maintained at a temperature below said fusion temperature and between about 270° F. and 330° F., which comprises an intimate mixture of about 30% to about 60% of filler, about 0.5% to about 1.5% of a waxy substance having a softening point below the temperature of said platen and the remainder binder, about 5% to about 20% of said binder being a fused thermoplastic elastomeric resin plasticized and plasticizer having a viscosity above 40 by Mooney to hold the composition in a unitary mass, and about 80% to about 95% of said binder being a vinyl resin having a specific viscosity of about 0.17 to about 0.31 uniformly dispersed throughout the fused composition in the form of discrete unplasticized with plasticizer and unfused particles and plasticizer for said dispersed resin.

8. A resinous molding composition in the form of a plastigel characterized by its high tensile strength and its ability to be readily stripped after pressing from a hot platen maintained at a temperature between 270° F. and 330° F., which comprises about 25% to about 80% filler, about 0.5% to 1.5% of a vegetable wax having a softening point below the temperature of said platen and the remainder binder, about 2% to about 30% of said binder being a plasticized and fused copolymer of butadiene and acrylonitrile having a viscosity above 40 by Mooney, about 70% to 98% of a copolymer of vinyl chloride and vinyl acetate having a specific viscosity of about 0.17 to about 0.31 being uniformly dispersed throughout the fused composition in the form of discrete unplasticized with plasticizer and unfused particles and plasticizer for said vinyl chloride copolymer.

References Cited in the file of this patent

UNITED STATES PATENTS

| | | |
|---|---|---|
| 1,454,939 | Michaelsen | May 15, 1923 |
| 2,137,636 | Barrett | Nov. 22, 1938 |
| 2,154,438 | Conklin | Apr. 18, 1939 |
| 2,473,319 | Winkelmann | June 14, 1949 |
| 2,558,378 | Petry | June 26, 1951 |
| 2,599,581 | Perkins | June 10, 1952 |
| 2,635,293 | Prance | Apr. 21, 1953 |
| 2,636,867 | Humfeld | Apr. 28, 1953 |
| 2,664,411 | Cooper | Dec. 29, 1953 |
| 2,769,726 | Wetterau et al. | Nov. 6, 1956 |

OTHER REFERENCES

Handbook of Plastics by Simonds et al,, 2d ed. (1949).